United States Patent [19]

Roth et al.

[11] 4,220,691
[45] Sep. 2, 1980

[54] SODIUM SULFUR CELL

[75] Inventors: Walter L. Roth, Schenectady; Stephan P. Mitoff, Clifton Park, both of N.Y.

[73] Assignee: Electric Power Research Institute, Inc., Palo Alto, Calif.

[21] Appl. No.: 945,624

[22] Filed: Sep. 25, 1978

[51] Int. Cl.² .......................................... H01M 12/39
[52] U.S. Cl. ................................... 429/104; 429/193
[58] Field of Search ............... 429/104, 193, 191, 218, 429/126, 102

[56] References Cited

U.S. PATENT DOCUMENTS

| | | | |
|---|---|---|---|
| 3,404,035 | 10/1968 | Kummer et al. | 429/104 X |
| 3,740,206 | 6/1973 | Christopher | 429/218 X |
| 3,933,523 | 1/1976 | Dubin et al. | 429/191 |
| 4,029,858 | 6/1977 | Evans et al. | 429/104 |
| 4,041,215 | 8/1977 | Kormanyos et al. | 429/104 |
| 4,048,391 | 9/1977 | Tilley et al. | 429/104 |
| 4,055,710 | 10/1977 | May et al. | 429/104 |
| 4,076,903 | 2/1978 | Sudworth et al. | 429/104 |

Primary Examiner—Anthony Skapars
Attorney, Agent, or Firm—Flehr, Hohbach, Test, Albritton & Herbert

[57] ABSTRACT

In a sodium sulfur cell including a beta-alumina separator between the sodium and sulfur compartments, high surface area gettering means, e.g., beta-alumina or beta"-alumina, for potassium and alkali earth metal ion impurities in the sodium to protect the separator. The gettering means is disposed in the sodium container in the form of particles or a continous porous shell or porous solid plug adjacent to the separator.

13 Claims, 3 Drawing Figures

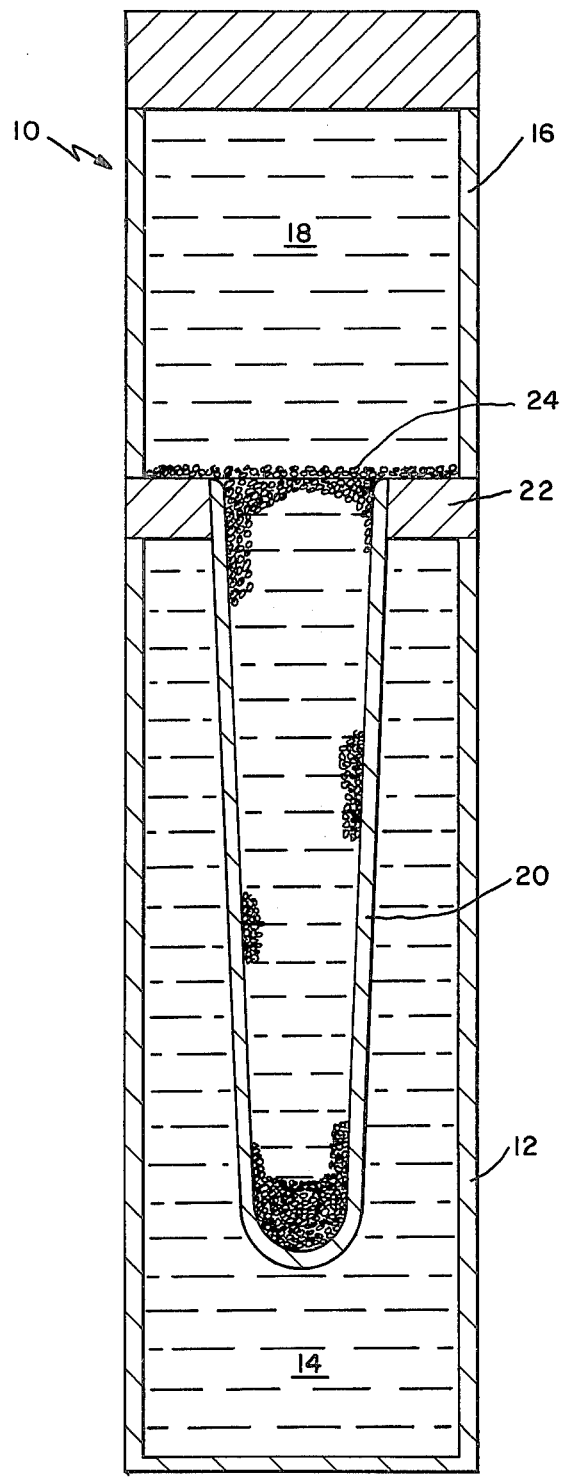
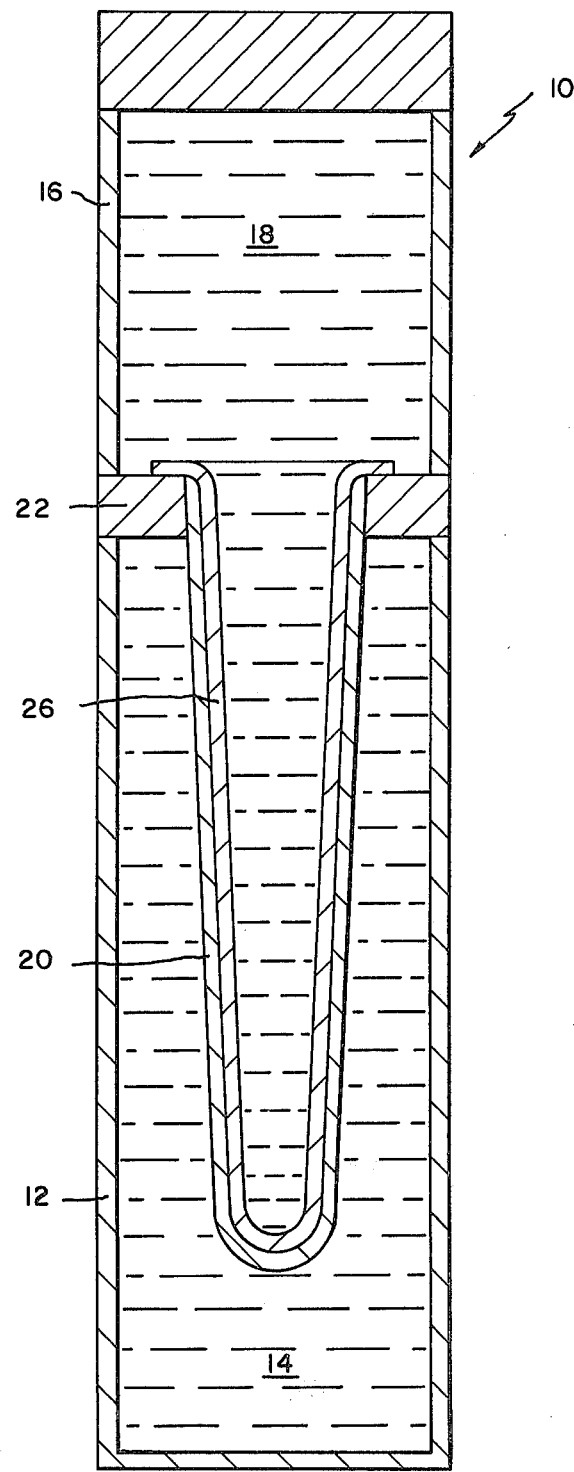
FIG.—1  FIG.—2

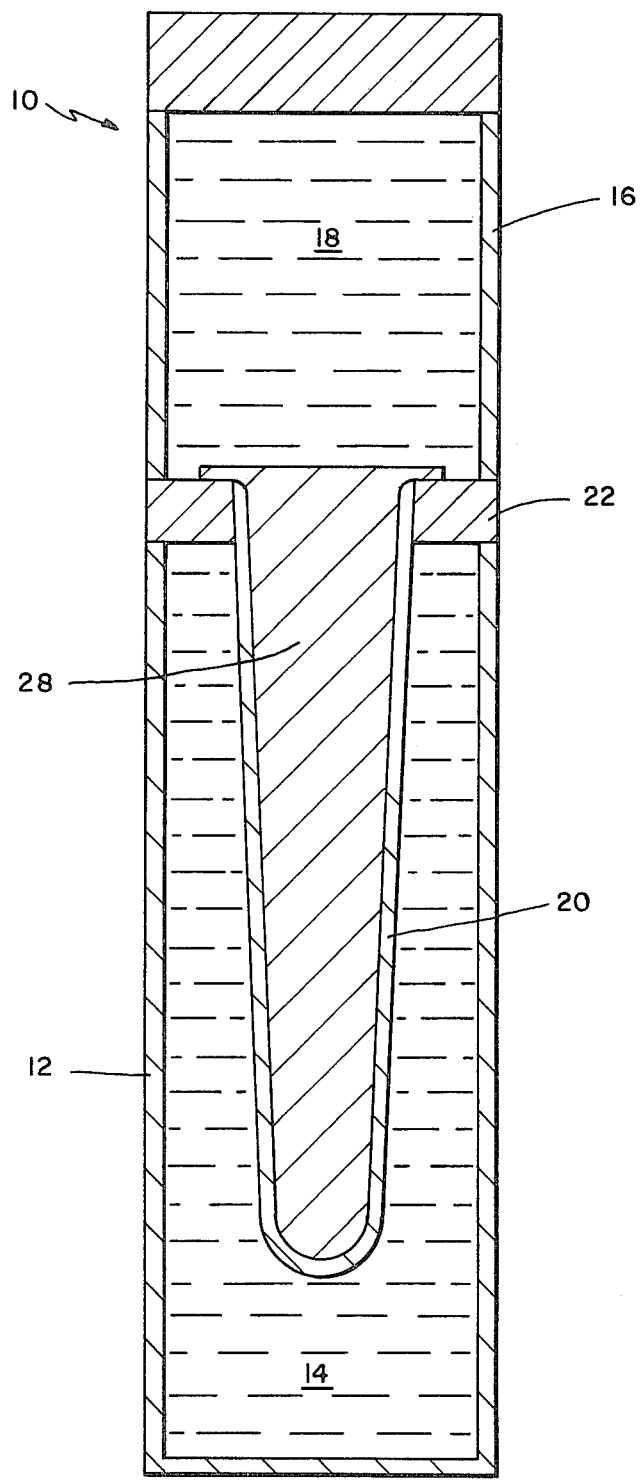
FIG.—3

SODIUM SULFUR CELL

CROSS-REFERENCE TO RELATED APPLICATIONS

Reference is made to related applications entitled "A Sodium Insert Container for a Sodium-Sulfur Cell and its Method of Use" in the name of Randall N. King, Ser. No. 945,623 filed Sept. 25, 1978 and entitled "A Sodium Insert Container for a Sodium-Sulfur Cell and Method" in the names of Stephan P. Mitoff and Randall N. King, Ser. No. 945,620 filed Sept. 25, 1978.

BACKGROUND OF THE INVENTION

The present invention relates to a sodium sulfur cell and more particularly to the presence of gettering means to protect the sodium ion conductive wall separating the sodium and sulfur in the cell.

A conventional sodium sulfur cell includes a container for molten sulfur, a container for molten sodium, and a sodium ion conductive separator in the form of a tube, typically of beta-alumina ceramic, extending between the two containers. In one type of cell disclosed in Christopher U.S. Pat. No. 3,740,206, the sodium is contained in an upper container and fills the interior of the tube while the sulfur fills the container exterior of the tube. In this configuration, the sulfur container serves as the positive electrode while the sodium container serves as the negative electrode with the beta-alumina tube serving as a solid electrolyte.

High purity sodium is essential for optimal performance of such sodium sulfur cells. Potassium and alkaline earth metal ions are undesirable impurities in sodium. These ions exchange with the sodium in the beta-alumina tube and tend to reduce its conductivity. Also, they distort the shape of the beta-alumina crystals which causes cracking of the tube. This could lead to a massive seal failure causing hazardous mixing of the sodium and sulfur. This is a particular problem for high volume power cells which would release corresponding high energy. As low as 200 parts per million potassium in the sodium source can cause such effects. It would be prohibitively expensive to purify sodium to levels substantially below the above value when employed in such larger cells. Accordingly, it is desirable to provide means for lowering the concentration of such impurities.

SUMMARY OF THE INVENTION AND OBJECTS

In accordance with the present invention, gettering means is provided for protecting the solid electrolyte separator between the sodium and sulfur compartments of a sodium sulfur cell from the adverse effects of high concentrations of potassium and alkaline earth metal impurities in the sodium. For a beta-alumina separator tube, the preferred gettering means is high surface area alkali metal beta-alumina or beta"-alumina. It may be in the form of powder or a sintered ceramic porous shell or a sintered porous plug placed on the sodium side of the separator tube, thereby reducing the volume of sodium liquid in the tube in the event of a crack in the tube wall, and reducing the flow rate of new sodium through the crack.

It is an object of the invention to protect the solid electrolyte separator in a sodium sulfur cell by gettering means for potassium and alkaline earth metal impurities.

It is another object of one embodiment of the invention to provide such a gettering means in the form of a shell or porous plug adjacent the sodium side of the separator capable of slowing the reactions between the sodium and sulfur in the event of a break in the separator.

Further objects and features of the invention will be apparent from the following description taken in conjunction with the accompanying drawing.

BRIEF DESCRIPTION OF THE DRAWING

FIG. 1 is a vertical sectional view of a sodium sulfur cell including particulate gettering means in accordance with the present invention.

FIG. 2 is another embodiment of the sodium sulfur cell of the present invention in which the gettering means comprises a sintered porous shell.

FIG. 3 is another embodiment of the sodium sulfur cell of the present invention in which the gettering means comprises a solid porous plug.

DETAILED DESCRIPTION OF THE PREFERRED EMBODIMENTS

Referring to FIG. 1, a conventional sodium sulfur cell is illustrated, generally designated by the reference number 10. The cell includes a bottom container 12 which is constructed of an electrically conductive material, for example, stainless steel and, as illustrated, is closed at its bottom end and opened at its top. Molten sulfur, and conductive carbon fibers, generally designated as 14, are located within this container. A second container 16, also constructed of an electrically conductive material, for example, stainless steel, is located above container 12 and is inverted relative to container 12, that is, includes a closed top and an open bottom. Sodium 18 is contained in the latter container.

Cell 10 also includes a sodium ion conductive solid electrolyte separator between containers 12 and 16 typically formed of beta-alumina ceramic. In a common form of cell, the separator is an open top tube 20.

When reference is made herein to the term "beta-alumina", it is intended to also include beta"-alumina. The former term refers to a theoretical formula of $Na_2O.11 Al_2O_3$ while the latter term refers to a theoretical formula of $Na_2O.5.33 Al_2O_3$. The foregoing definition of beta-alumina may also include additives such as $Li_2O$ and other ratios of $Na_2O$ to $Al_2O_3$.

Referring again to tube 20, it is closed at its bottom and opened at its top, extending from container 16 to the molten sulfur within container 12. That is, the tube opens into container 16 and hence, like container 16, the tube is filled with molten sodium. Tube 20 is supported in this position by means of a disc-shaped ceramic ring header 22, sealed between the rims of containers 12 and 16 and around the beta-alumina tube by known techniques to prevent leakage. Suitable details of construction of the sodium-sulfur cell are found in Breiter U.S. Pat. No. 3,959,013, incorporated at this point by reference.

It should be understood that in the illustrated embodiment, sodium is disposed in container 16 while sulfur is disposed in container 12. It should be understood that the sodium and sulfur containment may be reversed, if desired, in accordance with the present invention, so long as the gettering means is on the sodium side of tube 20. For simplicity of description, only the former embodiment will be described.

In its broadest aspect, applicants' invention resides in protecting the solid electrolyte (tube 20) from attack by impurities in the sodium source. It is known that potassium and alkaline earth metals are generally present as impurities in liquid sodium. The total elimination of these impurities prior to filling of the cell would be prohibitively expensive. However, even at relatively low concentrations, such impurities lead to detrimental effects such as reduction in conductivity of the solid electrolyte tube 20 by ion exchange with the sodium or ceramic cracking as by attack of the grain boundaries of the ceramic tube. Thus, the invention resides in gettering such impurities to reduce their concentration in the sodium and minimize such detrimental effects. This is accomplished by disposing the gettering means for such impurities on the sodium side of the tube of significantly higher surface area than that of the tube. In this manner, the impurities are preferentially gettered or taken up by the gettering means.

Referring again to FIG. 1, gettering means is illustrated in the form of powder 24 located within the sodium tube 20. Such gettering means is of a type which will ion exchange with the foregoing impurities. Preferential gettering means primarily is formed of the same material as tube 20, namely, beta or beta"-alumina ceramic referred to in composite by the term beta-alumina. The powder should provide sufficient surface area in composite to be many times the surface area of the inner wall of the tube, thereby effectively lowering the impurity ion available for attacking the tube. An increase in the surface area may be provided by increasing the total volume of powder 24 in contact with the sodium or by employing finer particles. The particle size of the powder should be above a level at which it forms an effective barrier against wetting by the molten sodium which must be in contact with tube 20. A suitable average particle size for such beta-alumina particles is on the order of 10 microns to 1 mm. A continuous liquid sodium fills the void spaces among the particles and is in electrical contact with tube 20.

The gettering powder 24 provides significant benefits. Primarily, it lowers the impurity level in the molten sodium and thereby protects tube 20 against structural attack and against lowered conductivity. In addition, if a crack does develop in the wall, the presence of such inert material dilutes the molten sodium and absorbs heat as the temperature rises to lower the potential hazard caused by direct contact of the molten sodium and sulfur. In addition, tube 20 must be completely filled to provide a discharge. The presence of the powder displaces a portion of the sodium and so less sodium is required to fill the tube.

Another embodiment of the invention is illustrated in FIG. 2. The basic sodium sulfur cell is the same as that of FIG. 1 and so like parts will be designated with like numbers. The form of gettering means is the only difference between the figures.

Referring to FIG. 2, the gettering means comprises a continuous porous shell 26 with a closed bottom and an open top closely adjacent to the sodium side of tube 20. The top of the shell flanges out to conform to the upper surface of header 22. In the illustrated embodiment, the shell conforms sufficiently to tube 20 that it is capable of reducing the flow of the sodium should a break failure occur thereby reducing the heat generated. If desired, it may, in fact, be sealed to tube 20 or header 22 to provide a complete container. The advantage of containment is to reduce the violent release of energy which the shell conforms sufficiently to tube 20 that it is capable of reducing the flow of the sodium should a break failure occur thereby reducing the heat generated. If desired, it may, in fact, be sealed to tube 20 or header 22 to provide a complete container. The advantage of containment is to reduce the violent release of energy which could occur if the molten sodium and sulfur rapidly contacted each other through a break in the wall of tube 20. Porous shell 26 would reduce the rate of such contact.

The primary function of shell 26 is the same as that of powder 24, namely, lowering the level of potassium and alkali earth metal ion impurities in the sodium to prevent the harmful effect on tube 20 as set out above. For this purpose, the surface area of porous shell 26 should be significantly larger than that of tube 20. This is accomplished by controlling the microstructure of the shell. It is preferable to form the shell of maximum interior surface area consistent with a structurally sound porous body. The porous tube must be of sufficient porosity to permit electrical contact of the molten sodium with the beta-alumina tube to thereby complete the circuit. On the other hand, it is preferably of low enough porosity to contain the molten sodium in the event of a break or failure of the beta-alumina tube. For these purposes, suitable maximum porosities are on the order of 20 to 40%.

A suitable technique for forming a porous shell 26 of the foregoing type is to press a powder of the beta-alumina particles and sinter the material e.g., at 1400° C. A suitable powder for this purpose is formed by spray drying beta-alumina powder in a size range of 0.1 to 10 microns to form free flowing spherical agglomerates. Pressing to the required shape is preferably performed isotactically. Alternatively, the powder may be slurried in a liquid such as amyl alcohol, and the shell is slip cast in a plaster mold.

Referring to FIG. 3, the gettering means comprises a solid porous plug 28 disposed at least partially in tube 20 and essentially filling the interior of the tube. It may be formed by the foregoing pressing and sintering technique. It includes an outer wall adjacent to and generally conforming to the configuration of tube 20. The top of the plug flanges and conforms to the upper surface of header 22. The porosity of the plug must meet the criteria of shell 26. Specifically, it must be sufficiently porous for the molten sodium to penetrate the pores and electrically contact the beta-alumina tube while providing a structurally sound body. For this purpose, the same order of maximum porosity (20-40%) as in shell 26 may be employed. One apparent advantage of the porous plug is that it is of far higher volume than shell 26 and so presents a more significant flow reduction barrier to molten sodium in the event of a failure, thereby further reducing the heat generated. Also, it reduces the sodium required to fill the cell.

In another embodiment, not shown, a smaller plug 28 may be used and spaced from tube 20 by suitable spacer means, such as spacer arms extending between the plug and tube, if desired.

The foregoing description refers to the gettering means as being in the form of a powder, shell or plug. It should be understood that other forms of the gettering means could be employed so long as sufficient surface area relative to the beta-alumina tube is provided to dominate the equilibrium between the gettering means and the tube for the metal impurity ions.

What is claimed is:

1. In an improved sodium sulfur cell including means for containing molten sulfur, means for containing molten sodium, and a solid sodium ion conductive electrolyte separator between said sulfur containing means and said sodium container, the improvement comprising gettering means for potassium and alkaline earth metals disposed on the sodium side of said separator, said gettering means being of significantly higher surface area than that of the sodium side of said tube.

2. The sodium sulfur cell of claim 1 in which said gettering means comprises a material selected from the group consisting of beta-alumina, beta"-alumina and mixtures thereof.

3. The sodium sulfur cell of claim 1 in which said gettering means is in powder form.

4. The sodium sulfur cell of claim 1 in which said separator is in the form of a closed bottom tube.

5. The sodium sulfur cell of claim 4 in which said gettering means is in the form of a continuous porous tubular shell disposed adjacent to the sodium side of said tube.

6. The sodium sulfur cell of claim 5 in which said porous shell is formed of a sintered ceramic material.

7. The sodium sulfur cell of claim 5 in which said porous shell comprises a material selected from the group consisting of beta-alumina, beta"-alumina, and mixtures thereof.

8. The sodium sulfur cell of claim 4 in which said porous shell is of a configuration to contain molten sodium in said tube.

9. The sodium sulfur cell of claim 5 in which said shell is of sufficient porosity to permit electrical contact of molten sodium with said tube but of low enough porosity to retain most of said molten sodium in the event of a break in said tube.

10. The sodium sulfur cell of claim 5 in which the sodium containing means is above and in open communication with the interior of said tube.

11. The sodium sulfur cell of claim 1 in which said separator is formed of beta-alumina.

12. The sodium sulfur cell of claim 1 in which said gettering means comprises a solid porous plug disposed at partially within said tube.

13. The sodium sulfur cell of claim 12 in which said plug is of sufficient porosity to permit electrical contact of molten sodium with said tube but of low enough porosity to retain most of said molten sodium in the event of a break in said tube.

* * * * *